United States Patent [19]

Yamamura

[11] Patent Number: 4,955,731
[45] Date of Patent: Sep. 11, 1990

[54] BEARING EQUIPMENT FOR VACUUM DEVICES

[75] Inventor: Akira Yamamura, Tokyo, Japan

[73] Assignee: Nippon Ferrofluidics Corporation, Tokyo, Japan

[21] Appl. No.: 344,651

[22] Filed: Apr. 27, 1989

[51] Int. Cl.5 ............................................. F16C 17/10
[52] U.S. Cl. ...................................... 384/133; 384/245
[58] Field of Search ............... 384/133, 108, 245, 446, 384/319, 478

[56] References Cited

U.S. PATENT DOCUMENTS

| 2,316,920 | 4/1943 | Weber | 384/245 |
| 4,671,679 | 6/1987 | Heshmat | 384/133 |
| 4,798,476 | 1/1989 | Sakatani et al. | 384/245 |
| 4,842,426 | 6/1989 | Furumura et al. | 384/133 |

Primary Examiner—Lenard A. Footland
Attorney, Agent, or Firm—David S. Woronoff

[57] ABSTRACT

A bearing for a vacuum device having an annular permanent magnet disposed about a rotatable shaft which has one end exposed to low pressure and the other end exposed to atmospheric pressure in which the rotatable shaft has a spherical member formed on the high pressure end for mating with a concave bearing surface having a magnetic fluid interposed therebetween and the rotatable shaft has a plurality of grooves formed thereon for aligning with a plurality of rings formed on an annular pole piece in which a magnetic fluid is disposed between the rings and grooves, which can be formed on the shaft, for providing a high pressure seal.

2 Claims, 1 Drawing Sheet

BEARING EQUIPMENT FOR VACUUM DEVICES

FIELD OF THE INVENTION

The present invention relates to a bearing structure for use with vacuum devices, especially vacuum pumps. Japanese Provisional Patent Publication No. 119813/1986 describes a bearing structure in which the bearing shaft has a spherical head to mate with a concave bearing surface in which a magnetic fluid (ferrofluid) is interposed between the ball and socket thus formed and held in place by a permanent magnet.

In utilizing such a structure in a high speed vacuum pump the bearing is sufficiently heated by the rotational friction to evaporate the magnetic fluid which results in bearing failure in an unacceptably short time.

In utilizing such a bearing in a high speed vacuum pump, it is conventional to enclose the bearing with its magnetic fluid on the low pressure side of the device. Such a disposition, leads to both inadequate cooling and the requirement that the magnetically susceptible fluid have an exceedingly low volatility. Such a requirement can be met only an at unacceptably high price economically.

SUMMARY OF THE INVENTION

The present invention discloses a bearing for a vacuum device having an annular permanent magnet disposed about a rotatable shaft which has one end exposed to low pressure and the other end exposed to atmospheric pressure in which the rotatable shaft has a spherical member formed on the high pressure end for mating with a concave bearing surface having a magnetic fluid interposed therebetween and the rotatable shaft has a plurality of grooves are formed thereon for aligning with a plurality of rings formed on an annular pole piece in which a magnetically susceptible fluid is disposed between the rings and grooves for providing a high pressure seal to keep the vacuum away from the bearing surfaces.

The present invention utilizes a single permanent magnet for holding both the sealing magnetic fluid and the bearing magnetic fluid in place.

The present invention makes the attitude (angular placement) of the bearing surfaces a matter of design choice because it is unrestricted.

DESCRIPTION

Figure 1:
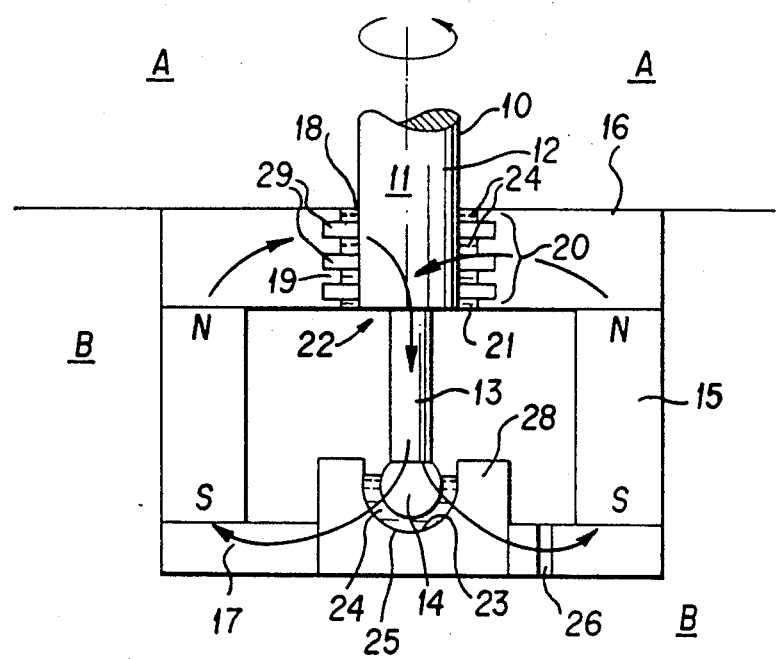
FIG. 1 shows one embodiment of the present invention is vertical sectional view taken along its center line.

In FIG. 1, number 10 shows generally a bearing device for use with vacuum devices which is exposed on one end, shown by the letter "A" to be low pressure, and which is exposed on the other end by letter "B" to be exposed to atmospheric pressure or other relatively high pressure.

A rotatable shaft 11 has a first portion 12 with a large diameter and a second portion 13 with a small diameter. The second portion of the shaft 11 has a partially spherically shaped head 14 formed on the end of the shaft. End 14 mates with spherically shaped concave surface 23 formed in axially extending central section 28 of the pole piece 17. Magnetic fluid 24 is interposed between members 14 and 23.

An annular permanent magnet 15 is held in place by annular pole pieces 16 and 17 placed on either axial end of the annular permanent magnet member 15. An orifice 18 if formed in pole piece 16 for permitting the insertion of portion 12 of shaft 11. Pole piece 16 also has formed thereon outwardly extending annular rings 29 which form grooves 19. Together rings 29 form a set of stages 20 of the sealing section 22. A magnetic fluid 21 is placed between the rings 29 and held in place by the magnetic flux from permanent magnet 15.

An aperture 16 is formed in pole piece 17 open to atmospheric or other high pressure which permits the bearing section 25 to be opened to greater density air for more efficient cooling and longer bearing life.

The magnetic circuit formed by the permanent magnet 15 is shown by the arrows in the figure. All of the pole pieces 16, 17, 28 and the entire shaft 11 are formed from magnetically permeable material.

Although the present invention has been shown by a single embodiment, the invention is not limited thereto. The invention includes those variations within the slope and spirit of the following claims.

What is claimed is:

1. A bearing device for a vacuum device comprising: first and second generally annular pole pieces;
a permanent magnet member having an annular shape fitted between said first and second annular pole pieces;
said first annular pole piece having a plurality of ring members formed on an inner surface thereof and an aperture formed centrally therein;
said second annular pole piece having a portion thereof formed into a concave spherical shape;
a rotatable shaft member having first and second portions;
said first portion having a larger diameter for fitting through the aperture formed in the first annular pole piece
said second portion having an end part formed into a partially spherical shape to mate with the concave spherical shape formed in second annular pole piece;
magnetic fluid means disposed intermediate the said mated spherical shapes and opposite said ring portions of said first annular pole piece.

2. The device claimed in claim 1 including further a plurality of groove members formed in said first portion of said rotatable shaft member and being aligned with the ring members of said first annular pole piece.

* * * * *